(12) United States Patent
Tachikawa

(10) Patent No.: US 8,825,307 B2
(45) Date of Patent: Sep. 2, 2014

(54) CONTROL DEVICE AND CONTROL METHOD OF ELECTRIC VEHICLE

(71) Applicant: Honda Motor Co., Ltd., Tokyo (JP)

(72) Inventor: Junya Tachikawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/978,821

(22) PCT Filed: Dec. 6, 2012

(86) PCT No.: PCT/JP2012/081681
§ 371 (c)(1),
(2), (4) Date: Jul. 9, 2013

(87) PCT Pub. No.: WO2013/089016
PCT Pub. Date: Jun. 20, 2013

(65) Prior Publication Data
US 2013/0282220 A1 Oct. 24, 2013

(30) Foreign Application Priority Data
Dec. 12, 2011 (JP) .................. 2011-271158

(51) Int. Cl.
| B60R 22/00 | (2006.01) |
| E05F 15/00 | (2006.01) |
| G05D 1/00 | (2006.01) |
| G06F 7/00 | (2006.01) |
| G06F 17/00 | (2006.01) |
| B60W 20/00 | (2006.01) |
| B60L 3/00 | (2006.01) |
| B60K 6/46 | (2007.10) |
| B60W 10/02 | (2006.01) |
| B60W 10/08 | (2006.01) |
| B60K 6/383 | (2007.10) |
| B60L 11/14 | (2006.01) |
| B60L 15/20 | (2006.01) |
| B60W 10/06 | (2006.01) |

(52) U.S. Cl.
CPC ............. B60W 20/108 (2013.01); Y10S 903/93 (2013.01); B60L 3/00 (2013.01); Y02T 10/6286 (2013.01); Y02T 10/6217 (2013.01); B60W 20/00 (2013.01); B60K 6/46 (2013.01); B60W 10/02 (2013.01); B60W 10/08 (2013.01); B60K 6/383 (2013.01); B60W 20/40 (2013.01); B60W 2600/00 (2013.01); B60L 11/14 (2013.01); B60L 15/20 (2013.01); Y02T 10/7077 (2013.01); B60W 10/06 (2013.01)
USPC .................. 701/48; 701/22; 701/36; 903/930

(58) Field of Classification Search
CPC ... B60W 20/108; B60W 20/40; B60W 10/02; B60W 10/08; B60W 20/00; B60W 2600/00; B60K 6/383; B60K 6/46; B60L 3/00; B60L 15/20; Y10S 903/93; Y02T 10/7077; Y02T 10/6286; Y02T 10/6217
USPC .............................. 701/22, 36, 48, 53, 55, 56
See application file for complete search history.

(56) References Cited

FOREIGN PATENT DOCUMENTS

| JP | 9-70195 A | 3/1997 |
| JP | 2003-127679 A | 5/2003 |
| JP | 2005-3023 A | 2/2005 |
| JP | 3923451 B2 | 5/2007 |
| JP | 2009-232485 A | 10/2009 |
| JP | 2011-06020 A | 1/2011 |
| JP | 2012-192886 A | 10/2012 |

OTHER PUBLICATIONS

International Search Report, PCT/JP2012/081681, Feb. 26, 2013.

*Primary Examiner* — Behrang Badii
*Assistant Examiner* — Daniel L Greene
(74) *Attorney, Agent, or Firm* — Westerman, Hattori, Daniels & Adrian, LLP

(57) ABSTRACT

In a control device of an electric vehicle, control unit switches energization such that a decrease in an output of a rotary electric machine in which a stall state is detected by stall state-detecting unit and an increase in an output of another rotary electric machine in which the stall state is not detected by the stall state-detecting unit are made to be the same.

7 Claims, 11 Drawing Sheets

CONTROL DEVICE AND CONTROL METHOD OF ELECTRIC VEHICLE

CROSS REFERENCE TO RELATED APPLICATIONS

This application is a National Stage entry of International Application PCT/JP2012/081681 filed Dec. 6, 2012, which claims priority of Japanese Patent Application No. 2011-271158 filed Dec. 12, 2011, the disclosure of these prior applications are hereby incorporated in their entirety by reference.

TECHNICAL FIELD

The present invention relates to a control device of an electric vehicle and a control method of an electric vehicle.

BACKGROUND

In the past, for example, in a vehicle such as a hybrid vehicle capable of operating only with the thrust of an electric motor, in a case where a so-called stall state is occurred where start cannot be performed due to large gradient load in spite of an accelerator pedal being ON at an uphill, an electric current may continuously flow to a specific switching element among a plurality of switching elements of an inverter, whereby the switching element may enter an overheated state.

On the other hand, a driving force control device is known in which the temperature of a switching element is detected and in a case where the temperature of the switching element becomes greater than or equal to a threshold value, a thrust by an electric motor is replaced with a mechanical braking force by a braking device, thereby reducing the temperature of the switching element and also preventing reverse of a vehicle (refer to Patent Document 1, for example).

Further, in the related art, for example, in a hybrid vehicle in which front wheels are driven by an internal-combustion engine and rear wheels are driven by an electric motor, in order to reduce thermal load of the electric motor, a control device of a hybrid vehicle is known which generates a mechanical braking force by a braking device and also reduces a driving force by the internal-combustion engine in a case where the rear wheels rotate reversely, thereby stopping the vehicle (refer to Patent Document 2, for example).

CITATION LIST

Patent Literature

[Patent Document 1] Japanese Unexamined Patent Application, First Publication No. 2009-232485
[Patent Document 2] Japanese Patent No. 3923451

SUMMARY

Technical Problem

However, according to the driving force control device relating to the related art described above, after the thrust is replaced with the braking force in, for example, a half-throttle state, if a change in driving force request occurs such as an accelerator being further pushed or the accelerator being slightly returned and then further pushed again, a problem arises in that due to a delay of time or the like which is required to increase the output of the electric motor, it becomes difficult to secure the proper responsiveness following the change in driving force request, and the desired merchantability.

Further, according to the control device of a hybrid vehicle relating to the related art described above, since the braking device is operated after the reverse of the vehicle is detected, the amount of reverse of the vehicle is sometimes increased in accordance with an increase in the gradient of a traveling road.

An aspect of the present invention has been made in view of the above-described circumstances and has an object to provide a control device of an electric vehicle and a control method of an electric vehicle, in which it is possible to secure driving force responsiveness based on the request of the driver while preventing excessive heat generation of power equipment.

Solution to Problem

In order to achieve the object, a control device of an electric vehicle according to an aspect of the invention adopts the following configurations.

According to an aspect of the invention, a control device of an electric vehicle is provided, including: a plurality of rotary electric machines that generate power for vehicle running; a plurality of energization control units that control energization of each of the plurality of the rotary electric machines; a state quantity-detecting unit that detects a state quantity related to a temperature of each of the plurality of the energization control units; a stall state-detecting unit that detects the presence or the absence of a stall state where, in an energization state of the rotary electric machine, a rotation stops or a rotational speed becomes less than or equal to a predetermined speed; and a control unit that switches energization of the rotary electric machine in which the stall state is detected, to energization of another rotary electric machine in which the stall state is not detected by the stall state-detecting unit, among the plurality of the rotary electric machines, in a case where the state quantity detected by the state quantity-detecting unit with respect to the rotary electric machine in which the stall state is detected by the stall state-detecting unit exceeds a predetermined threshold value, wherein the control unit switches energization such that a decrease in an output of the rotary electric machine in which the stall state is detected by the stall state-detecting unit and an increase in an output of the another rotary electric machine in which the stall state is not detected by the stall state-detecting unit are made to be the same, and
the control unit performs switching to an energization phase different from a previous energization phase, when restarting energization of the rotary electric machine of which energization has been stopped depending on the stall state having been detected by the stall state-detecting unit and the state quantity detected by the state quantity-detecting unit having exceeded the predetermined threshold value.

According to another aspect of the invention, a control method of an electric vehicle is provided that includes: a plurality of rotary electric machines that generate power for vehicle running; a plurality of energization control units that control energization of each of the plurality of the rotary electric machines; a state quantity-detecting unit that detects a state quantity related to a temperature of each of the plurality of the energization control units; a stall state-detecting unit that detects the presence or the absence of a stall state where, in an energization state of the rotary electric machine, a rotation stops or a rotational speed becomes less than or equal to a predetermined speed; and a control unit that switches energization of the rotary electric machine in which the stall state is detected, to energization of another rotary electric machine in which the stall state is not detected by the stall state-detecting unit, among the plurality of the rotary electric machines, in a case where the state quantity detected by the state quantity-detecting unit with respect to the rotary electric machine in which the stall state is detected by the stall state-detecting unit exceeds a predetermined threshold value, the control method including: switching energization such that a decrease in an output of the rotary electric machine in which the stall state is detected by the stall state-detecting unit and an increase in an output of the another rotary electric machine in which the stall state is not detected by the stall state-detecting unit are made to be the same.

Advantages

According to the aspect of the invention, even in a case where a stall state in which rotation of the rotary electric machine that is in an energization state stops or the rotational speed becomes less than or equal to a predetermined speed has occurred, for example, in a case where the speed of the electric vehicle has been reduced to zero at an uphill, or the like, the rotary electric machine which is subjected to energization (that is, the rotary electric machine assuming a stall state) is switched based on the temperature of the energization control unit. For this reason, it is possible to cool power equipment such as the energization control unit and the rotary electric machines without reversing the electric vehicle, and thus it is possible to prevent the temperature of the power equipment from rising excessively.

In addition, even if the rotary electric machine which is subjected to energization is switched, a decrease in the output of the rotary electric machine of which enegization is stopped is compensated for by an increase in the output of the rotary electric machine of which energization is started, and thereby the output of the rotary electric machines as a whole is unchangeably maintained. For this reason, even in a case where the required driving force of the driver is changed, it is possible to secure the proper responsiveness following the change, and the desired merchantability.

Since an energization phase is switched and energization is then restarted, concentration of energization on a single energization phase is prevented, and thus a local and excessive increase in the temperature of the power equipment such as the energization control unit and the rotary electric machine can be prevented.

According to the another aspect of the invention, even in a case where a stall state in which rotation of the rotary electric machine that is in an energization state stops or the rotational speed becomes less than or equal to a predetermined speed has occurred, for example, in a case where the speed of the electric vehicle has been reduced to zero at an uphill, or the like, the rotary electric machine which is subjected to energization (that is, the rotary electric machine assuming a stall state) is switched based on the temperature of the energization control unit. For this reason, it is possible to cool the power equipment such as the energization control unit and the rotary electric machine without reversing the electric vehicle, and thus it is possible to prevent the temperature of the power equipment from rising excessively.

In addition, even if the rotary electric machine which is subjected to energization is switched, a decrease in the output of the rotary electric machine of which enegization is stopped is compensated for by an increase in the output of the rotary electric machine of which energization is started, and thereby the output of the rotary electric machines as a whole is unchangeably maintained. For this reason, even in a case where the required driving force of the driver is changed, it is possible to secure the proper responsiveness following the change, and the desired merchantability.

DESCRIPTION OF EMBODIMENTS

Hereinafter, a control device of an electric vehicle according to an embodiment of the invention will be described referring to the accompanying drawings.

Figure 1:
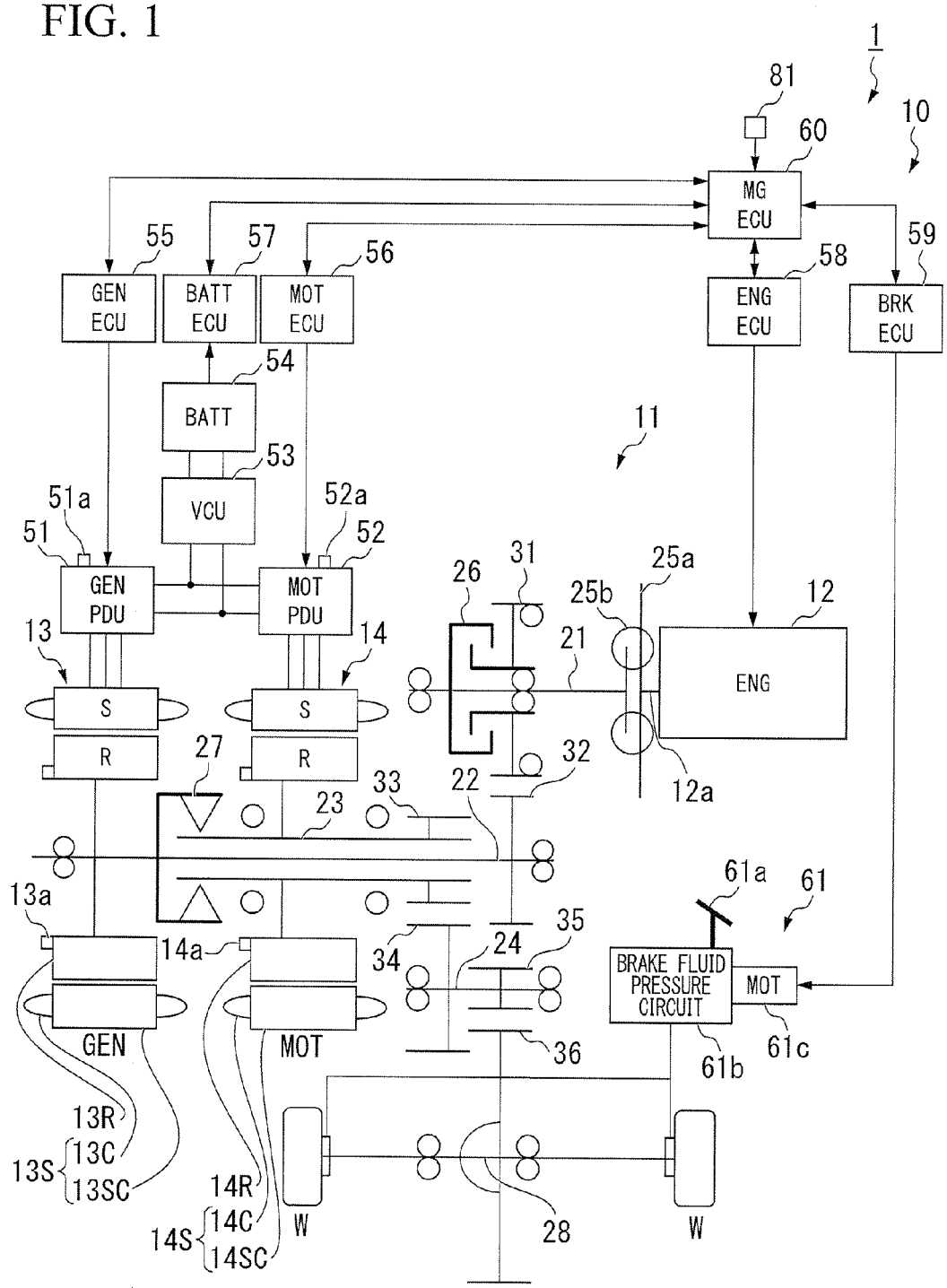
FIG. 1 is a configuration diagram of a control device of an electric vehicle according to an embodiment of the invention.

A control device of an electric vehicle 10 according to this embodiment is mounted on a hybrid vehicle 1 shown in FIG. 1, for example, and the hybrid vehicle 1 is, for example, a series type hybrid vehicle in which a motor for power generation (GEN, a rotary electric machine, or a first rotary electric machine) 13 is connected to an internal-combustion engine (ENG) 12 through a power transmission mechanism 11 and a motor for running (MOT, a rotary electric machine, or a second rotary electric machine) 14 is connected to driving wheels W through the power transmission mechanism 11.

The power transmission mechanism 11 is configured to include, for example, a first driving shaft 21, a second driving shaft (a rotary shaft) 22, a third driving shaft (a rotary shaft) 23, a fourth driving shaft 24, a drive plate 25a, a damper 25b, a clutch 26, a one-way clutch 27, a differential 28, a first gear 31, a second gear 32, a third gear 33, a fourth gear 34, a fifth gear 35, and a differential gear 36.

More specifically, a crankshaft 12a of the internal-combustion engine 12 and the first driving shaft 21 are disposed coaxially with each other with the drive plate 25a and the damper 25b interposed therebetween, and connected so as to rotate integrally with each other.

Then, the first gear 31 and the clutch 26 are mounted on the first driving shaft 21.

The first gear 31 is an idle gear that is rotatable with respect to the first driving shaft 21, and is connected to or separated from the first driving shaft 21 by the clutch 26.

That is, the clutch 26 selectively switches between a connection state of enabling power transmission between the first driving shaft 21 and the first gear 31 and a separation state of cutting off power transmission between the first driving shaft 21 and the first gear 31.

Further, the first gear 31 is always meshed with the second gear 32 fixed to the second driving shaft 22 disposed parallel to the first driving shaft 21.

The second driving shaft 22 forms a rotary shaft of the motor for power generation 13 and is disposed coaxially with the third driving shaft 23 having a tubular shape and fowling a rotary shaft of the motor for running 14.

That is, the second driving shaft 22 is disposed on the inner periphery side of the third driving shaft 23 as an inner peripheral shaft, so to speak, and the third driving shaft 23 is disposed so as to surround the outer periphery side of the second driving shaft 22 as an outer peripheral shaft, so to speak.

Then, the one-way clutch 27 is mounted on the second driving shaft 22 and the third driving shaft 23.

The one-way clutch 27 connects the second driving shaft 22 and the third driving shaft 23 so as to transmit a driving force that normally rotates the motor for running 14 with the third driving shaft 23 as the rotary shaft, from the second driving shaft 22 to the third driving shaft 23, for example, at the time of normal rotation driving of the motor for power generation 13 with the second driving shaft 22 as the rotary shaft.

On the other hand, at the time of reverse rotation driving of the motor for power generation 13 with the second driving shaft 22 as the rotary shaft, the one-way clutch 27 idles the second driving shaft 22 with respect to the third driving shaft 23.

Further, the one-way clutch 27 idles the third driving shaft 23 with respect to the second driving shaft 22 in a case where the motor for running 14 with the third driving shaft 23 as the rotary shaft rotates normally, for example, at the time of stop of the motor for power generation 13 with the second driving shaft 22 as the rotary shaft.

On the other hand, at the time of reverse rotation driving of the motor for running 14 with the third driving shaft 23 as the rotary shaft, the one-way clutch 27 connects the second driving shaft 22 and the third driving shaft 23 so as to transmit a driving force that reversely rotates the motor for power generation 13 with the second driving shaft 22 as the rotary shaft, from the third driving shaft 23 to the second driving shaft 22.

Then, the third gear 33 is mounted on the third driving shaft 23.

The third gear 33 is fixed to the third driving shaft 23 and always meshed with the fourth gear 34 fixed to the fourth driving shaft 24 disposed parallel to the third driving shaft 23.

In addition, the fifth gear 35 is mounted on the fourth driving shaft 24.

The fifth gear 35 is fixed to the fourth driving shaft 24 and always meshed with the differential gear 36.

The differential 28 distributes a driving force transmitted to the differential gear 36 between the right and left driving wheels W.

In addition, the one-way clutch 27 is disposed between the motor for power generation 13 and the motor for running 14 so as to overlap, in an axial direction, a portion of at least one of a stator 13S of the motor for power generation 13 and a stator 14S of the motor for running 14.

Figure 2:
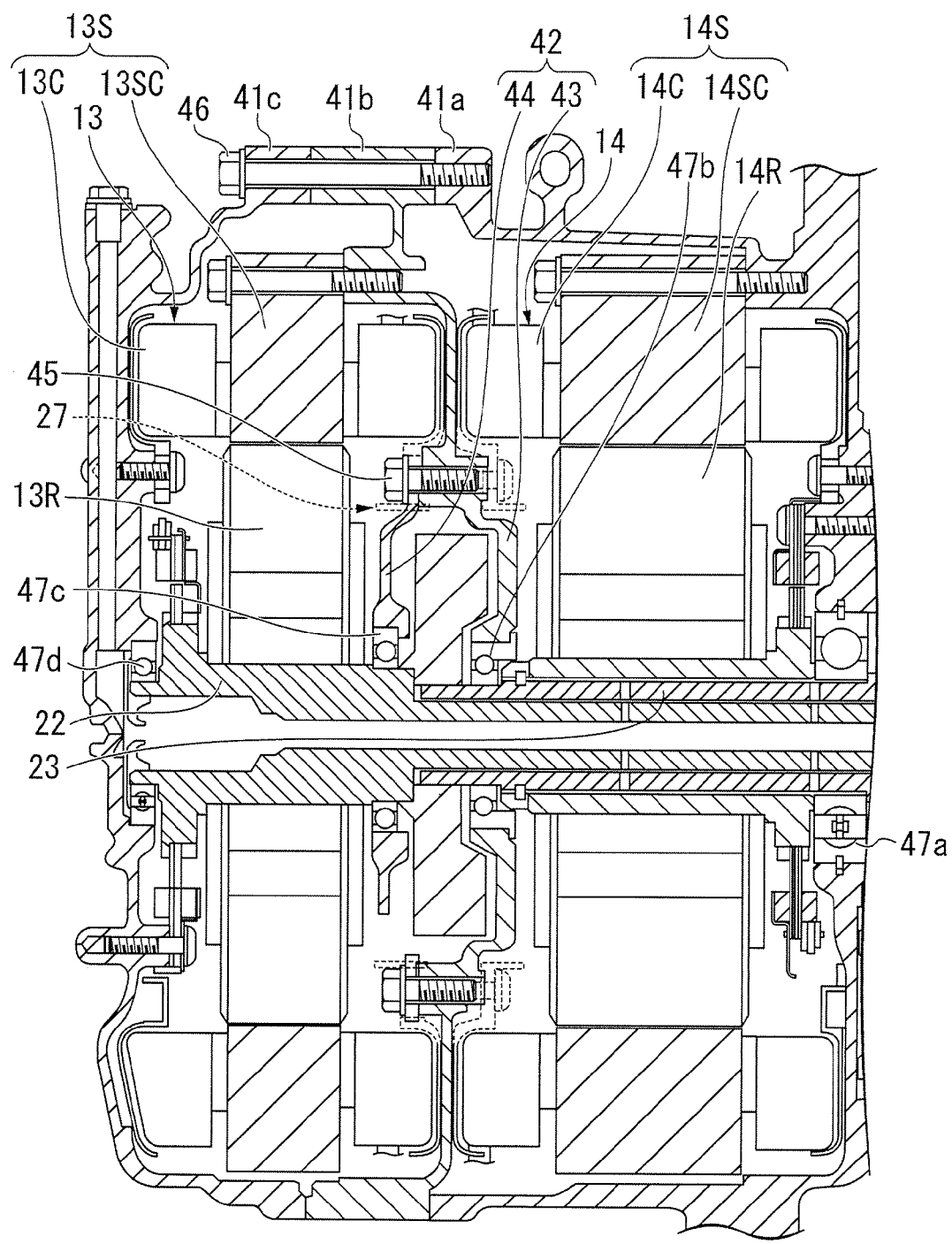
FIG. 2 is a configuration diagram of a motor for power generation (GEN), a motor for running (MOT), and a one-way clutch of a hybrid vehicle according to the embodiment of the invention.
Figure 3:
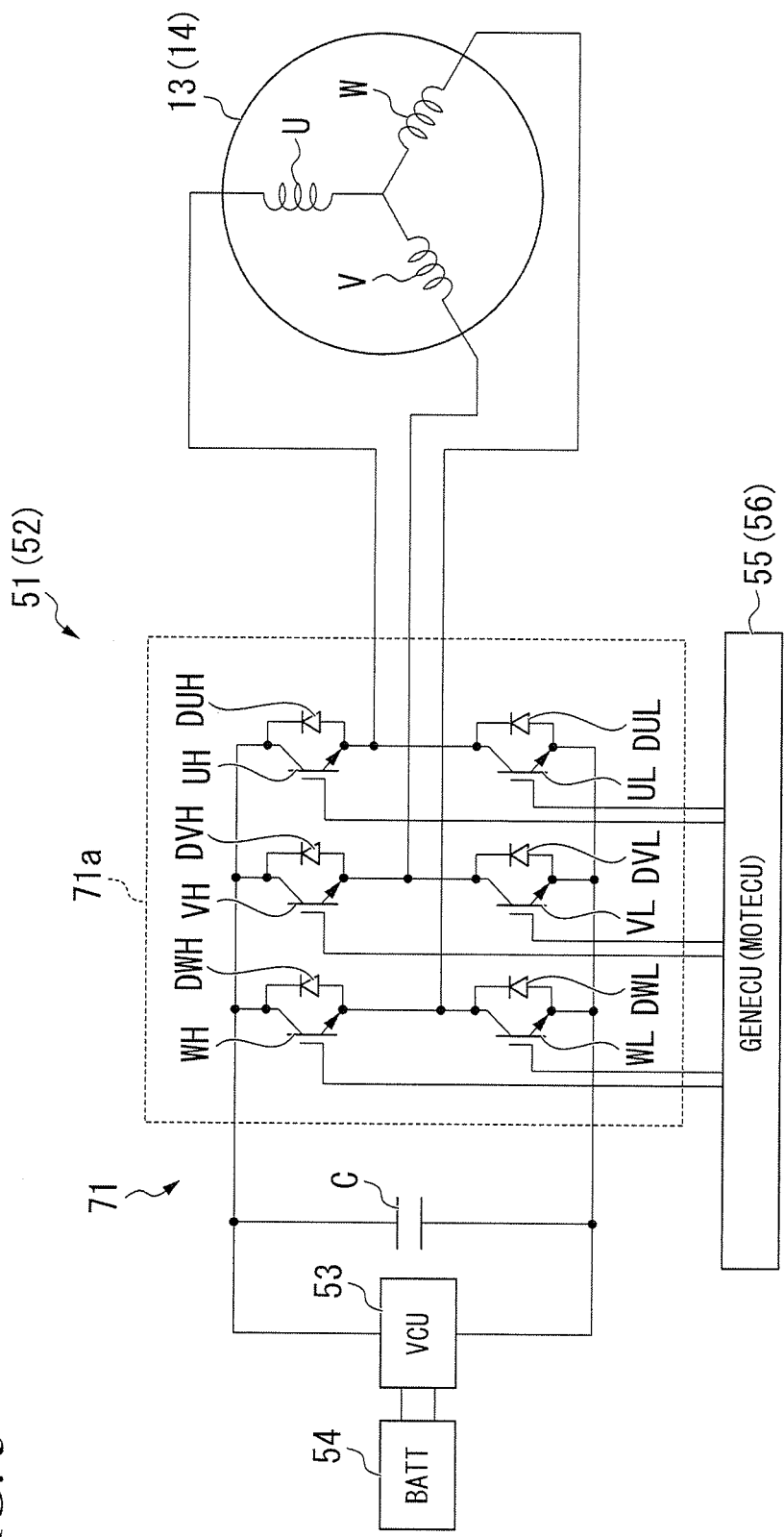
FIG. 3 is a configuration diagram of a power drive unit for power generation (GENPDU) and a power drive unit for running (MOTPDU) according to the embodiment of the invention.

For example, the one-way clutch 27 shown in FIG. 2 is disposed between the motor for power generation 13 and the motor for running 14 so as to overlap, in the axial direction, a coil 13C wound around a stator core 13SC of the stator 13S of the motor for power generation 13 and a coil 14C wound around a stator core 14SC of the stator 14S of the motor for running 14.

More specifically, the motor for running 14 includes a rotor 14R fixed to the third driving shaft 23, and the stator 14S fixed to a first case 41a and disposed to face the rotor 14R, and the stator 14S includes the stator core 14SC, and the coil 14C wound around the stator core 14SC.

Further, the motor for power generation 13 includes a rotor 13R fixed to the second driving shaft 22, and the stator 13S fixed to a second case 41b and disposed to face the rotor 13R, and the stator 13S includes the stator core 13SC, and the coil 13C wound around the stator core 13SC.

Then, an accommodation chamber 42 which accommodates the one-way clutch 27 inside is disposed between the rotor 13R of the motor for power generation 13 and the rotor 14R of the motor for running 14 on power transmission pathways between the second driving shaft 22 and the third driving shaft 23 in the axial directions of the second driving shaft 22 and the third driving shaft 23.

The accommodation chamber 42 is formed by fastening, with bolts 45, a second wall portion 44 to a first wall portion 43 formed at the second case 41b.

The first, second, and third cases 41a, 41b, and 41c are fixed to each other by a plurality of bolts 46, and the first case 41a is fixed to a damper housing (not shown) which accommodates the damper 25b.

Then, the third driving shaft 23 which forms the rotary shaft of the motor for running 14 is rotatably supported on the first case 41a by a bearing 47a disposed between the motor for running 14 and the third gear 33, and rotatably supported on the first wall portion 43 of the accommodation chamber 42 formed in the second case 41b by a bearing 47b at an end portion on the motor for power generation 13 side.

Further, the second driving shaft 22 which forms the rotary shaft of the motor for power generation 13 is rotatably supported on the second wall portion 44 of the accommodation chamber 42 formed in the second case 41b by a bearing 47c at an end portion on the motor for running 14 side, and rotatably supported on the third case 41c by a bearing 47c at an end portion on the opposite side to the motor for running 14 side.

Each of the motor for power generation 13 and the motor for running 14 is a three-phase, for example, a U-phase, a V-phase, and a W-phase, DC brushless motor and is made to be able to perform a powering operation and a power generation operation.

For example, in the motor for power generation 13, an alternating-current U-phase current Iu, an alternating-current V-phase current Iv, and an alternating-current W-phase current Iw are applied to the coils 13C of the respective phases, whereby the powering operation is performed to perform driving of the internal-combustion engine 12 or the driving wheels W, and in addition, a driving force is transmitted thereto from the internal-combustion engine 12, whereby the power generation operation is performed to output the generated electric power.

Further, for example, in the motor for running 14, the alternating-current U-phase current Iu, the alternating-current V-phase current Iv, and the alternating-current W-phase current Iw are applied to the coils 14C of the respective phases, whereby the powering operation is performed to perform driving of the driving wheels W, and in addition, a driving force is transmitted thereto from the driving wheels W side at the time of deceleration or the like of the hybrid vehicle 1, whereby the power generation operation (a regeneration operation) is performed to output the generated electric power (regenerated electric power).

The control device of an electric vehicle 10 includes, for example, a power drive unit for power generation (GENPDU, or energization control unit) 51 which controls energization of the motor for power generation 13, a power drive unit for running (MOTPDU, or energization control unit) 52 which controls energization of the motor for running 14, a voltage regulator (VCU; Voltage Control Unit) 53, a battery (BATT) 54, and a GENECU 55, a MOTECU 56, a BATTECU 57, an ENGECU 58, a BRKECU 59, and an MGECU (state quantity-detecting unit, stall state-detecting unit, control unit, or required driving force-detecting unit) 60, as various ECUs (Electronic Control Units) which are configured by electronic circuits such as a CPU (Central Processing Unit), and a braking device 61.

Each of the GENPDU 51 and the MOTPDU 52 is configured to include an inverter 71 by pulse width modulation (PWM), which includes a bridge circuit 71a that is formed by bridge connection using a plurality of switching elements such as transistors, for example.

The inverter 71 includes the bridge circuit 71a which is formed by bridge connection using a plurality of switching elements (for example, IGBTs: Insulated Gate Bipolar mode Transistors, or the like), and a smoothing capacitor C connected between a positive electrode-side terminal and a negative electrode-side terminal of the bridge circuit 71a.

The bridge circuit 71a is driven by a signal subjected to pulse width modulation, which is output from the GENECU 55 or the MOTECU 56.

In the bridge circuit 71a, for example, a high side U-phase transistor UH and a low side U-phase transistor UL which foil a pair with respect to a U-phase, a high side V-phase transistor VH and a low side V-phase transistor VL which form a pair with respect to a V-phase, and a high side W-phase transistor WH and a low side W-phase transistor WL which form a pair with respect to a W-phase are bridge-connected.

In each of the high side U-phase transistor UH, the high side V-phase transistor VH, and the high side W-phase transistor WH, the collector is connected to the positive electrode-side terminal, thereby configuring a high side arm.

In each of the low side U-phase transistor UL, the low side V-phase transistor VL, and the low side W-phase transistor WL, the emitter is connected to the negative electrode-side terminal, thereby configuring a low side arm.

The emitter of the high side U-phase transistor UH is connected to the collector of the low side U-phase transistor UL, the emitter of the high side V-phase transistor VH is connected to the collector of the low side V-phase transistor VL, and the emitter of the high side W-phase transistor WH is connected to the collector of the low side W-phase transistor WL.

Each of diodes DUH, DUL, DVH, DVL, DWH, and DWL is connected between the collector and the emitter of each of the transistors UH, UL, VH, VL, WH, and WL in such a manner that a direction toward the collector from the emitter becomes a forward direction.

Then, connection points of the high side arms and the low side arms in the U-phase, the V-phase, and the W-phase of the bridge circuit 71a are respectively connected to the U-phase, V-phase, and W-phase coils 13C of the motor for power generation 13 or the U-phase, V-phase, and W-phase coils 14C of the motor for running 14.

The inverter 71 switches ON (conduction)/OFF (cutoff) states of the transistors which form a pair for each phase of the U-phase, the V-phase, and the W-phase, on the basis of a gate signal (that is, a PWM signal) that is a switching command which is output from the GENECU 55 or the MOTECU 56 and input to the gates of the transistors UH, VH, WH, UL, VL, and WL, for example, at the time of the powering operation of the motor for power generation 13 or the motor for running 14.

In this way, the alternating-current U-phase current Iu, the alternating-current V-phase current Iv, and the alternating-current W-phase current Iw are applied by converting direct-current power which is supplied from the battery 54 through the voltage regulator 53 into three-phase alternating-current power and sequentially switching energization of the U-phase, V-phase, and W-phase coils 13C of the motor for power generation 13 or the U-phase, V-phase, and W-phase coils 14C of the motor for running 14.

On the other hand, for example, at the time of the power generation operation of the motor for power generation 13 or the motor for running 14, the inverter 71 turns on (conduction) or off (cutoff) each transistor based on the gate signal synchronized on the basis of the angle of rotation of the rotor 13R of the motor for power generation 13 or the rotor 14R of the motor for running 14 and converts alternating-current generated electric power which is output from the motor for power generation 13 or the motor for running 14 into direct-current power.

The GENPDU 51 performs sending and receiving of electric power between the motor for power generation 13 and the battery 54 through the voltage regulator 53, and the MOTPDU 52 performs sending and receiving of electric power between the motor for running 14 and the battery 54 through the voltage regulator 53. In addition to this, the GENPDU 51 and the MOTPDU 52 enable sending and receiving of electric power between the motor for power generation 13 and the motor for running 14 and enable supply of the generated electric power which is output from the motor for power generation 13 by the power of, for example, the internal-combustion engine 12, to the motor for running 14 which performs the powering operation.

The voltage regulator 53 is configured to include, for example, a DC/DC converter or the like, and the voltage regulators 53 are connected between the GENPDU 51 and the battery 54 and between the MOTPDU 52 and the battery 54 and perform voltage adjustment with respect to sending and receiving of electric power between the GENPDU 51 and the battery 54 and between the MOTPDU 52 and the battery 54.

The GENECU 55 controls an operation (energization) of the motor for power generation 13 through the GENPDU 51 by outputting a switching command (a gate signal) which is input to the gate of each of the transistors UH, VH, WH, UL, VL, and WL of the inverter 71 that is included in the GENPDU 51.

The MOTECU 56 controls an operation (energization) of the motor for running 14 through the MOTPDU 52 by outputting a switching command (a gate signal) which is input to the gate of each of the transistors UH, VH, WH, UL, VL, and WL of the inverter 71 that is included in the MOTPDU 52.

In addition, the switching command (the gate signal) which is output from the GENECU 55 to the GENPDU 51 and the switching command (the gate signal) which is output from the MOTECU 56 to the GENPDU 52 are pulse signals for ON/OFF driving of the transistors UH, VH, WH, UL, VL, and WL of the inverter 71. The operations (energization) of each of the motor for power generation 13 and the motor for running 14 are controlled based on the duty of the pulse signal, that is, the ratio of ON/OFF.

The BATTECU 57 performs control of, for example, monitoring, protection, and the like of the battery 54.

For example, the BATTECU 57 calculates the remaining capacity of the battery 54 on the basis of detection signals of the voltage, the current, and the temperature of the battery 54 and used hours or the like of the battery 54.

The ENGECU 58 controls, for example, fuel supply to the internal-combustion engine 12, ignition timing, or the like.

The BRKECU 59 controls the braking device 61 provided in a wheel such as the driving wheel W, for example.

The braking device 61 has a structure to generate a frictional force that becomes a braking force of each wheel between a brake disc and a brake pad, for example, by pressing the brake pad, with brake fluid pressure, against the brake disc rotatable integrally with each wheel.

The braking device 61 includes, for example, a brake pedal 61*a*, a brake fluid pressure circuit 61*b*, and a brake motor 61*c*.

The brake fluid pressure circuit 61*b* is configured so as to be able to generate brake fluid pressure which is supplied to each wheel, by, for example, a master cylinder which is linked to an operation of the brake pedal 61*a*, or a motor cylinder which is driven by the brake motor 61*c* regardless of the operation of the brake pedal 61*a*.

The MGECU 60 performs management and control of the other ECUs 55 to 59 and controls the operation states of the internal-combustion engine 12 and each of the motors 13 and 14 and the state of the hybrid vehicle 1 in concert with the ECUs 55 to 59.

For this reason, detection signals which are output from various sensors that detect state quantities related to the states of the internal-combustion engine 12, the motor for power generation 13, the motor for running 14, the GENPDU 51, and the MOTPDU 52, detection signals which are output from various sensors that detect state quantities related to the running states of the hybrid vehicle 1, signals which are output from various switches, and the like are input to the MGECU 60.

For example, detection signals which are output from rotation sensors (stall state-detecting unit) 13*a* and 14*a* such as resolvers that detect the angles of rotation of the motor for power generation 13 and the motor for running 14, sensors (state quantity-detecting unit) 51*a* and 52*a* that detect state quantities (for example, the number of energizations, voltage, current, temperature, or the like) related to the temperatures of the GENPDU 51 and the MOTPDU 52, an accelerator position sensor 81 (required driving force-detecting unit) that detects the amount of stroke of an accelerator pedal (the accelerator position) by pushing of the accelerator pedal concerning the required driving force of the driver, a vehicle speed sensor that detects the speed of the hybrid vehicle 1, and the like are input to the MGECU 60.

The control device of an electric vehicle 10 according to this embodiment has the configuration described above, and next, an operation of the control device of an electric vehicle 10 will be described.

Figure 4:
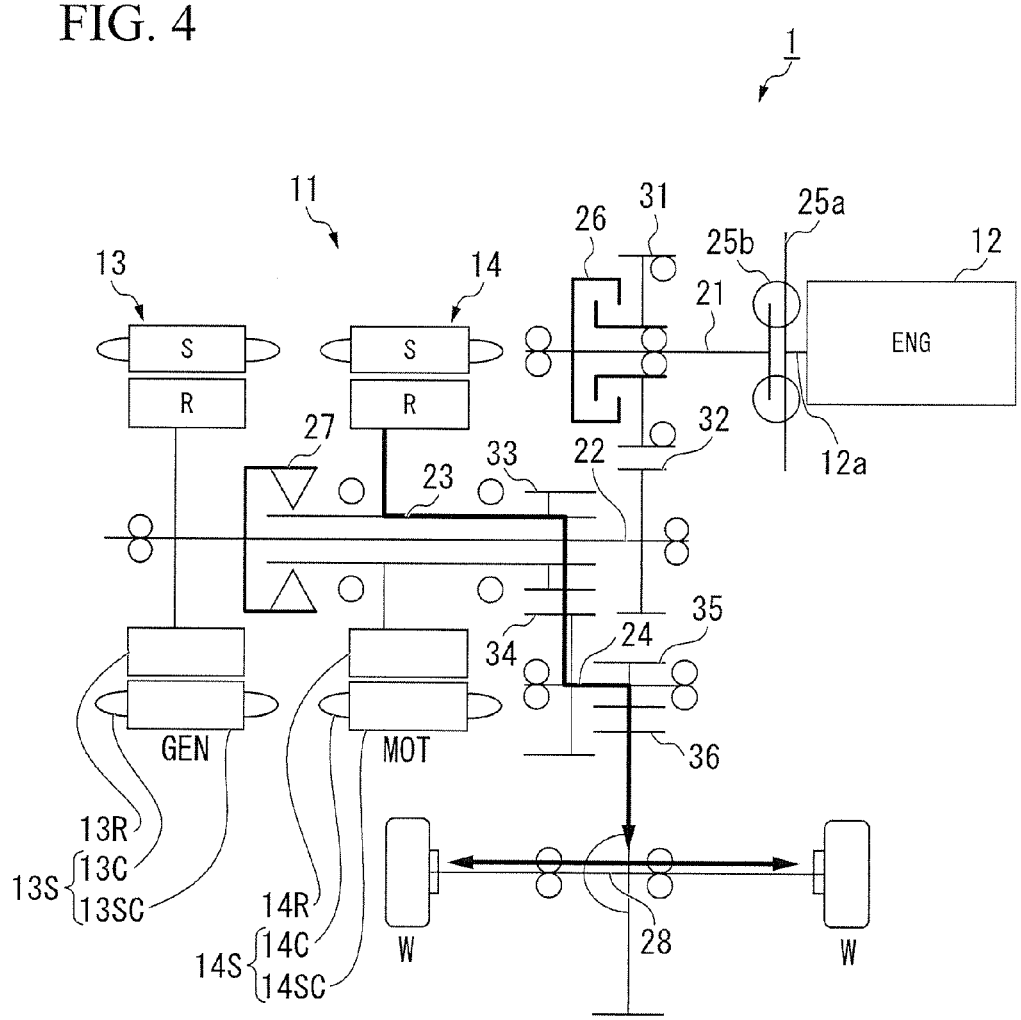
FIG. 4 is a diagram showing a power transmission pathway in a first EV mode of the hybrid vehicle according to the embodiment of the invention.
Figure 5:
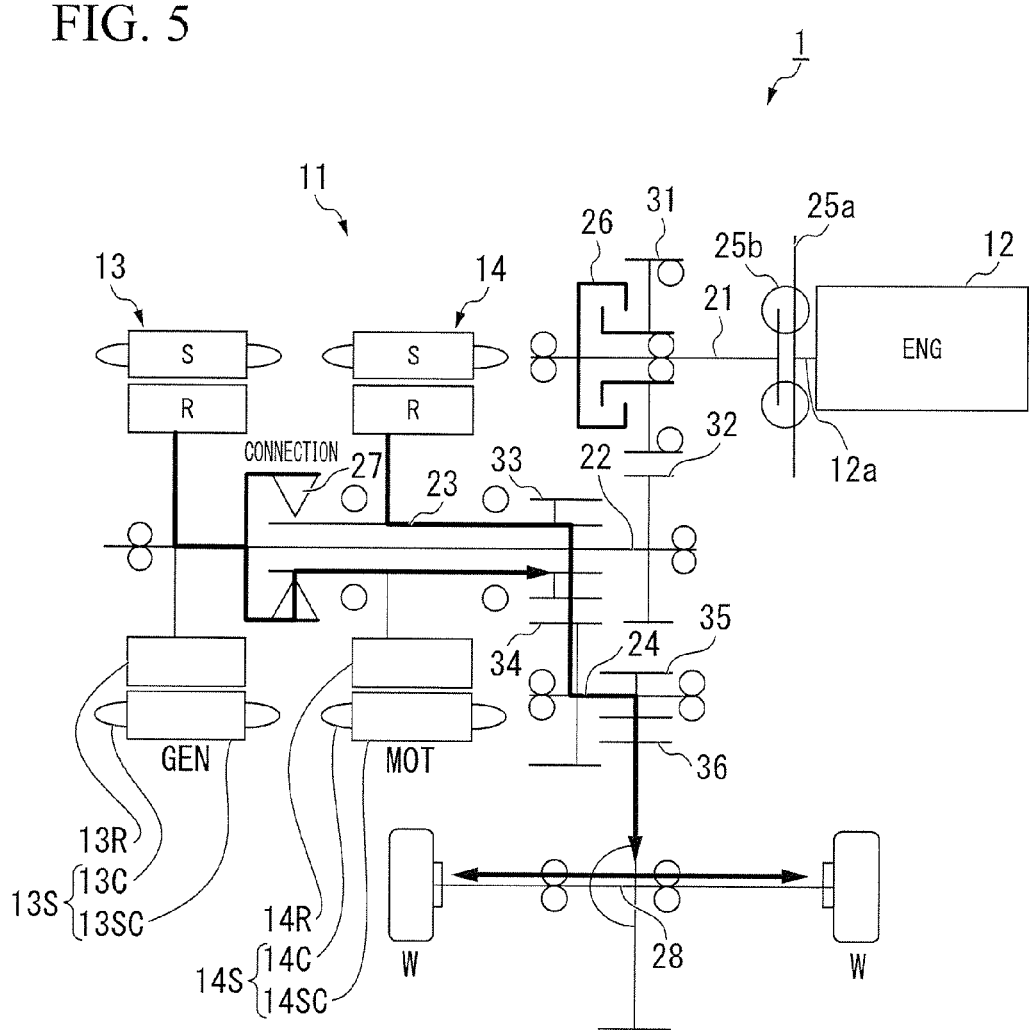
FIG. 5 is a diagram showing a power transmission pathway in a second EV mode of the hybrid vehicle according to the embodiment of the invention.
Figure 6:
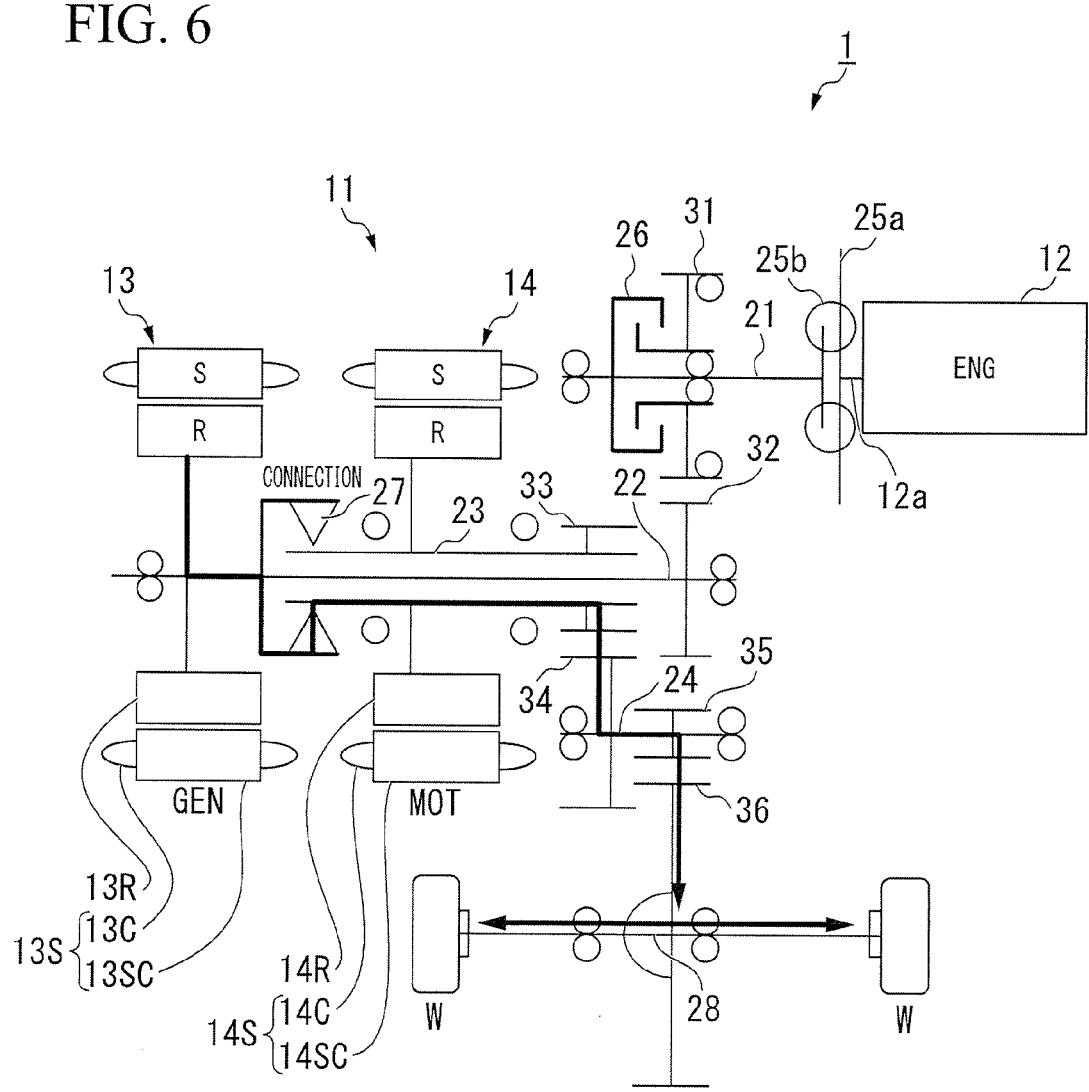
FIG. 6 is a diagram showing a power transmission pathway in a third EV mode of the hybrid vehicle according to the embodiment of the invention.
Figure 7:
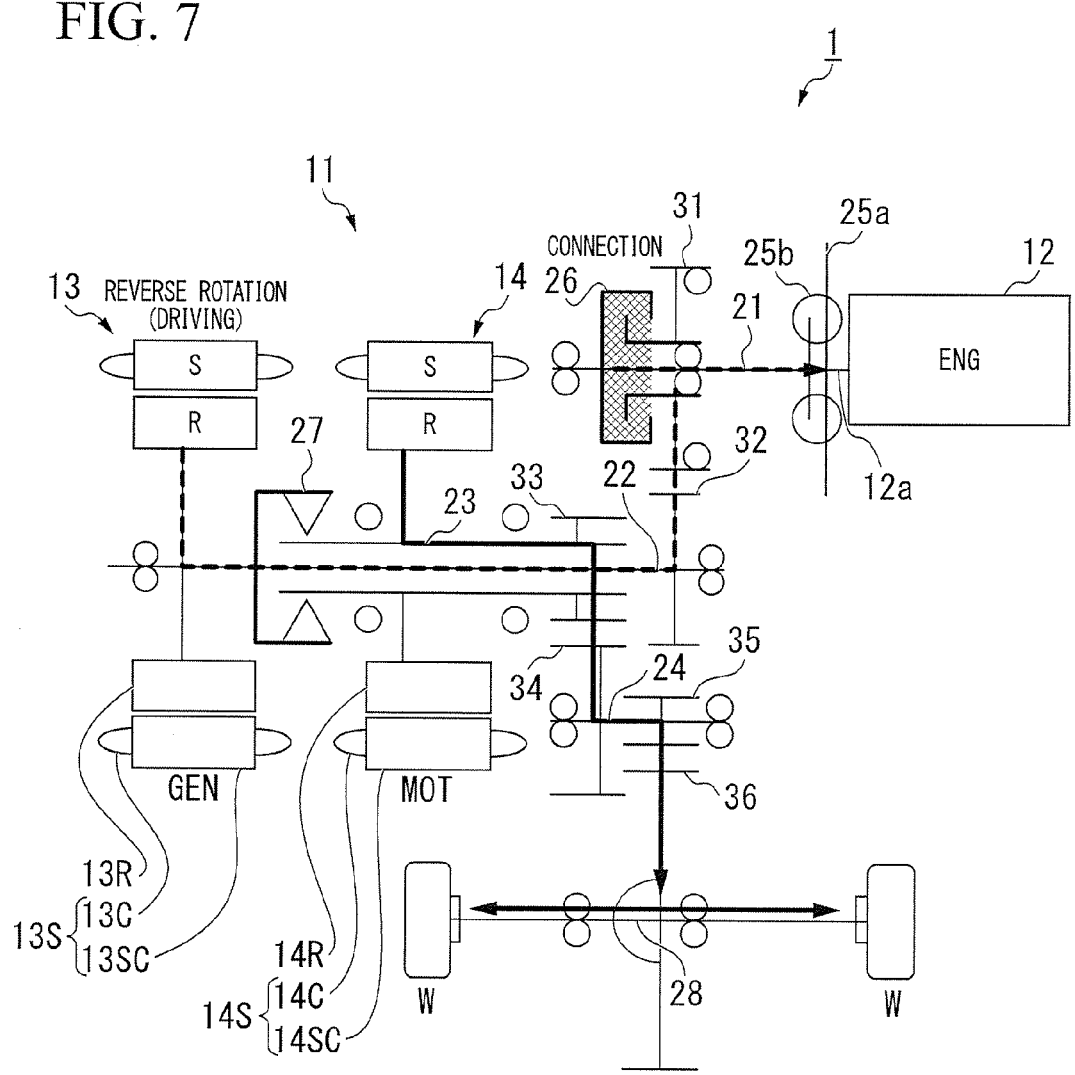
FIG. 7 is a diagram showing a power transmission pathway in an internal-combustion engine starting mode of the hybrid vehicle according to the embodiment of the invention.
Figure 8:
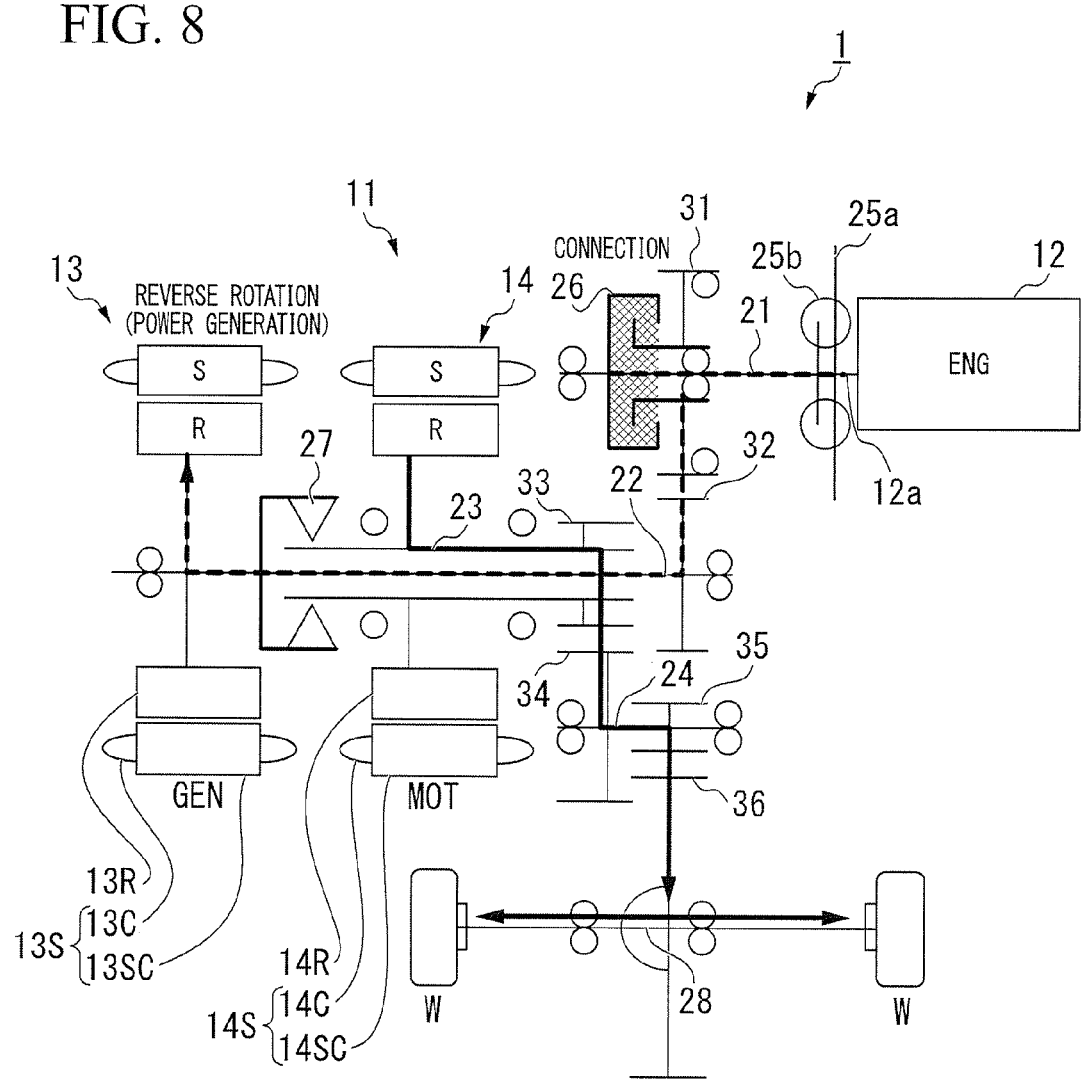
FIG. 8 is a diagram showing a power transmission pathway in a series EV mode of the hybrid vehicle according to the embodiment of the invention.
Figure 9:
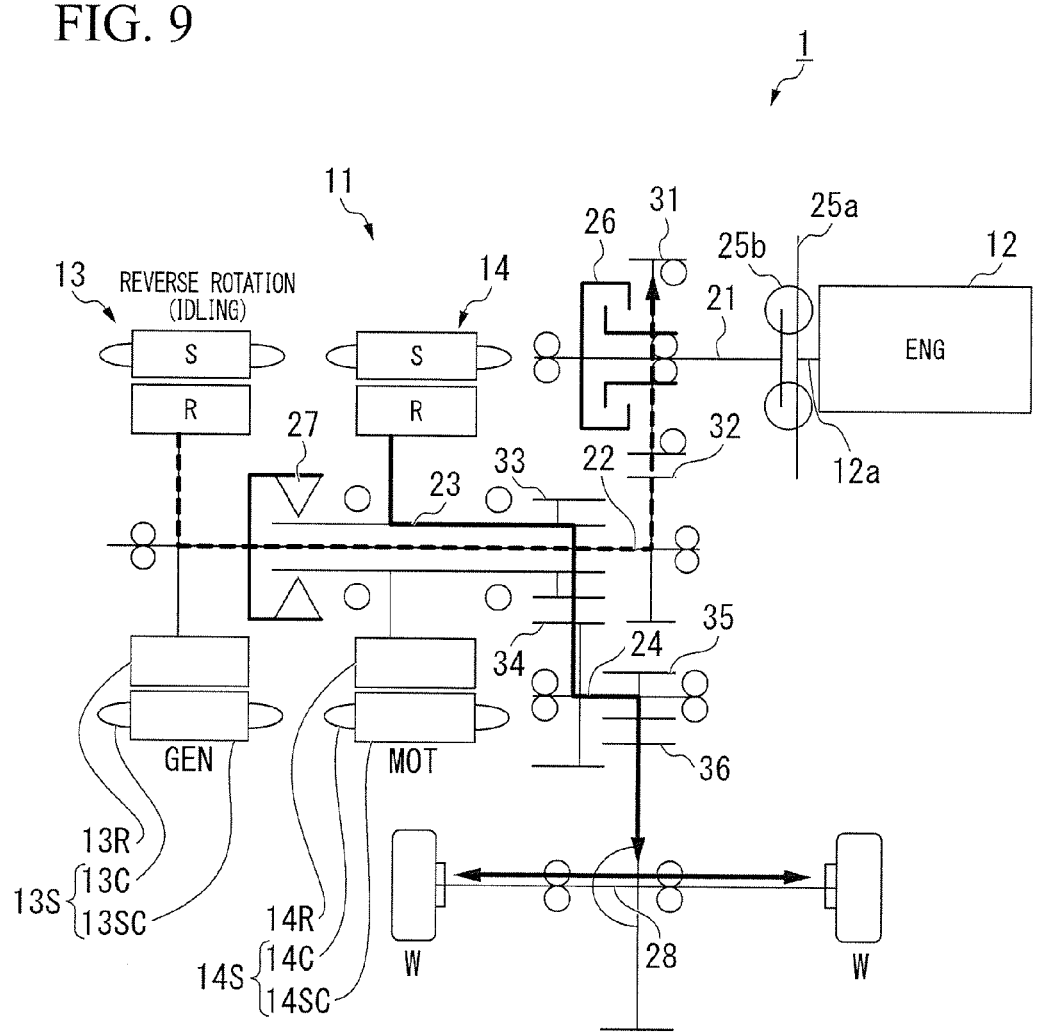
FIG. 9 is a diagram showing a power transmission pathway in an energization phase-switching mode of the hybrid vehicle according to the embodiment of the invention.

The MGECU 60 in this embodiment has, as operation modes of the hybrid vehicle 1, for example, a first EV mode shown in FIG. 4, a second EV mode shown in FIG. 5, a third EV mode shown in FIG. 6, an internal-combustion engine starting mode shown in FIG. 7, a series EV mode shown in FIG. 8, and an energization phase-switching mode shown in FIG. 9.

The first EV mode shown in, for example, FIG. 4 is an operation mode to drive the motor for running 14 by only electric power which is output from the battery 54 and transmit a driving force which is output from the motor for running 14 to the driving wheels W.

The first EV mode is selected, for example, in a case where a required driving force for the hybrid vehicle 1 is less than a predetermined value, at the time of reverse of the hybrid vehicle 1, in a case where energy efficiency is higher than that in other operation modes related to driving of the driving wheels W, or the like.

In addition, in the first EV mode, the internal-combustion engine 12 is in a stopped state and the clutch 26 is in a separation state to cut off power transmission between the first driving shaft 21 and the first gear 31.

Then, at the time of the normal rotation of the motor for running 14, since the second driving shaft 22 idles with respect to the third driving shaft 23 due to the one-way clutch 27, the motor for power generation 13 is in a stopped state.

On the other hand, at the time of the reverse rotation of the motor for running 14, since a driving force is transmitted from the third driving shaft 23 to the second driving shaft 22 by the one-way clutch 27, the motor for power generation 13 is in a state of being rotated following the reverse rotation by the driving force of the motor for running 14.

Further, the second EV mode shown in, for example, FIG. 5 is an operation mode to drive the motor for power generation 13 and the motor for running 14 by only electric power which is output from the battery 54 and transmit a driving force which is output from the motor for power generation 13 and the motor for running 14 to the driving wheels W.

In the second EV mode, the internal-combustion engine 12 is in a stopped state, the motor for power generation 13 and the motor for running 14 rotate normally, and the clutch 26 is in a separation state to cut off power transmission between the first driving shaft 21 and the first gear 31.

Further, the third EV mode shown in, for example, FIG. 6 is an operation mode to drive the motor for power generation 13 by only electric power which is output from the battery 54 and transmit the driving force which is output from the motor for power generation 13 to the driving wheels W.

The third EV mode is selected, for example, in a case where energy efficiency, including energy loss associated with co-rotation of the motor for running 14 by the driving force of the motor for power generation 13, is higher than that in other operation modes related to driving of the driving wheels W, or the like.

In addition, in the third EV mode, the internal-combustion engine 12 is in a stopped state, the motor for power generation 13 rotates normally, and the clutch 26 is in a separation state to cut off power transmission between the first driving shaft 21 and the first gear 31.

Further, at the time of the normal rotation of the motor for power generation 13, since a driving force is transmitted from the second driving shaft 22 to the third driving shaft 23 by the one-way clutch 27, the motor for running 14 is in a state of being rotated following the normal rotation by the driving force of the motor for power generation 13.

Further, the internal-combustion engine starting mode shown in, for example, FIG. 7 is an operation mode to drive the motor for power generation 13 by only electric power which is output from the battery 54 and transmit a driving force which is output from the motor for power generation 13 to the internal-combustion engine 12, thereby starting the internal-combustion engine 12.

In the internal-combustion engine starting mode, the motor for power generation 13 rotates reversely and the clutch 26 is in a connection state to enable power transmission between the first driving shaft 21 and the first gear 31.

Further, since the second driving shaft 22 idles with respect to the third driving shaft 23 due to the one-way clutch 27, a state is created where the driving force which is output from the motor for power generation 13 is not transmitted to the motor for running 14 and the driving wheels W.

Then, in a case where running of the hybrid vehicle 1 is required, the motor for running 14 is driven by only electric power which is output from the battery 54 and a driving force which is output from the motor for running 14 is transmitted to the driving wheels W.

Further, the series EV mode shown in, for example, FIG. 8 is an operation mode to drive the internal-combustion engine 12, transmit a driving force which is output from the internal-combustion engine 12 to the motor for power generation 13, thereby performing a power generation operation of the motor for power generation 13, drive the motor for running 14 by electric power which is output from the battery 54 or the generated electric power which is output from the motor for power generation 13, and transmit a driving force which is output from the motor for running 14 to the driving wheels W.

In the series EV mode, since the clutch 26 is in a connection state to enable power transmission between the first driving shaft 21 and the first gear 31, the motor for power generation 13 rotates reversely, and the second driving shaft 22 idles with respect to the third driving shaft 23 due to the one-way clutch 27, a state is created where a driving force which is output from the motor for power generation 13 is not transmitted to the motor for running 14 and the driving wheels W.

On the other hand, since the motor for running 14 rotates normally and the third driving shaft 23 idles with respect to the second driving shaft 22 due to the one-way clutch 27, a driving force which is output from the motor for running 14 is transmitted to only the driving wheels W.

Further, the energization phase-switching mode shown in, for example, FIG. 9 is an operation mode to switch an energization phase by driving the motor for power generation 13 by electric power which is output from the battery 54, prior to energization start (or energization restart) of the motor for power generation 13 assuming a stall state.

In the energization phase-switching mode, the internal-combustion engine 12 is in a stopped state, the motor for power generation 13 rotates reversely, and the clutch 26 is in a separation state to cut off power transmission between the first driving shaft 21 and the first gear 31.

Further, since the second driving shaft 22 idles with respect to the third driving shaft 23 due to the one-way clutch 27, a state is created where a driving force which is output from the motor for power generation 13 is not transmitted to the motor for running 14 and the driving wheels W.

On the other hand, in a case where a required driving force for the hybrid vehicle 1 is less than a predetermined value and a stall state of the motor for running 14 is required to be maintained, since the motor for running 14 is driven in a normal rotation direction by only electric power which is output from the battery 54 and the third driving shaft 23 idles with respect to the second driving shaft 22 due to the one-way clutch 27, a driving force which is output from the motor for running 14 is transmitted to only the driving wheels W.

Hereinafter, description will be made with regard to an operation of the MGECU 60 in a case where a so-called stall state in which in spite of the accelerator pedal being subjected to a ON operation at, for example, an uphill or the like, the hybrid vehicle 1 cannot start due to large gradient load, that is a state where rotation stops or a rotational speed becomes less than or equal to a predetermined speed has occurred in an energization state of the motor for running 14 or the motor for power generation 13 in which a driving force can be transmitted to the driving wheels W.

At the time of execution of the first EV mode shown in, for example, FIG. 4, if a stall state where rotation stops or a rotational speed becomes less than or equal to a predetermined speed occurs in an energization state of the motor for running 14, energization is continued in only a specific transistor among the respective transistors UH, VH, WH, UL, VL, and WL of the inverter 71 of the MOTPDU 52, and thus the temperature of the MOTPDU 52 rises.

At this time, the MGECU 60 determines whether or not the temperature of the inverter 71 of the MOTPDU 52 has become higher than a predetermined temperature, on the basis of a detection signal which is output from a sensor that detects a state quantity (for example, the number of energizations, voltage, current, temperature, or the like) related to the temperature of the MOTPDU 52.

Then, in a case where it is determined that the temperature of the inverter 71 of the MOTPDU 52 has become higher than a predetermined temperature, the operation mode of the hybrid vehicle 1 is switched from the first EV mode to the second EV mode shown in, for example, FIG. 5 and energization of the motor for power generation 13 is started, thereby reducing the amount of energization of the motor for running 14 and also increasing the amount of energization of the motor for power generation 13.

At this time, the MGECU 60 switches energization such that a decrease in the output of the motor for running 14 and an increase in the output of the motor for power generation 13 are made to be the same and controls energization such that a total driving force which is transmitted from the motor for running 14 and the motor for power generation 13 to the driving wheels W becomes equal to a required driving force (that is, such that, if a required driving force is constant, a total driving force also becomes constant).

Then, the operation mode of the hybrid vehicle 1 is switched from the second EV mode to the third EV mode shown in, for example, FIG. 6, thereby making only the motor for power generation 13 be in a stall state.

As a result, energization is continued in only a specific transistor among the respective transistors UH, VH, WH, UL, VL, and WL of the inverter 71 of the GENPDU 51, and thus the temperature of the GENPDU 51 rises.

At this time, the MGECU 60 determines whether or not the temperature of the inverter 71 of the GENPDU 51 has become higher than a predetermined temperature, on the basis of a detection signal which is output from a sensor that detects a state quantity (for example, the number of energizations, voltage, current, temperature, or the like) related to the temperature of the GENPDU 51.

Then, in a case where it is determined that the temperature of the inverter 71 of the GENPDU 51 has become higher than a predetermined temperature, the operation mode of the hybrid vehicle 1 is switched from the third EV mode to the second EV mode and energization of the motor for running 14 is started, thereby reducing the amount of energization of the motor for power generation 13 and also increasing the amount of energization of the motor for running 14.

At this time, the MGECU 60 switches energization such that a decrease in the output of the motor for power generation 13 and an increase in the output of the motor for running 14 are made to be the same and controls energization such that a total driving force which is transmitted from the motor for power generation 13 and the motor for running 14 to the driving wheels W becomes equal to a required driving force (that is, such that, if a required driving force is constant, a total driving force also becomes constant).

Then, the operation mode of the hybrid vehicle 1 is switched from the second EV mode to the first EV mode, thereby making only the motor for running 14 be in a stall state.

Then, the MGECU 60 repeatedly executes the above-described operations, that is, switching of energization between the motor for running 14 and the motor for power generation 13 until a stall state of the hybrid vehicle 1 is eliminated Hereinafter, a flowchart of processing which is executed by the MGECU 60 will be described.

Figure 10:
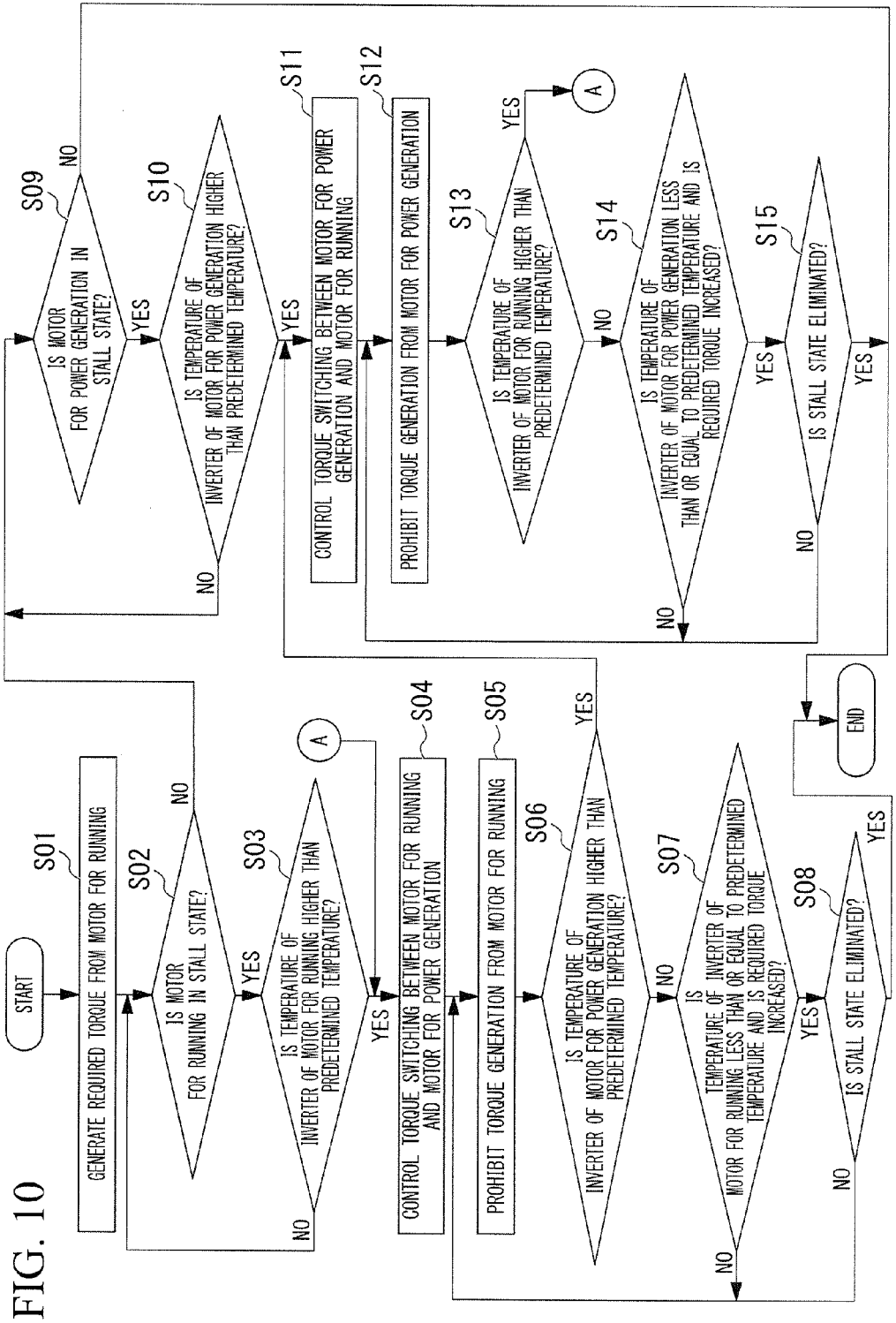
FIG. 10 is a flowchart showing an operation of the control device of an electric vehicle according to the embodiment of the invention.

First, in a step S01 shown in, for example, FIG. 10, required torque corresponding to the required driving force of the driver based on a signal or the like of a detection result which is output from, for example, the accelerator position sensor 81 is generated from the motor for running 14.

Next, in a step S02, whether or not the motor for running 14 is in a stall state, that is, a state where rotation stops or a rotational speed becomes less than or equal to a predetermined speed occurs in an energization state of the motor for running 14 which can transmit a driving force to the driving wheels W, is determined In a case where a determination result is "NO", the processing proceeds to a step S09, which will be described later.

On the other hand, in a case where the determination result is "YES", the processing proceeds to a step S03.

Then, in the step S03, whether or not the temperature of the inverter 71 of the MOTPDU 52 that controls energization of the motor for running 14 is higher than a predetermined temperature is determined In a case where the determination result is "NO", the processing returns to the step S02 described above.

On the other hand, in a case where the determination result is "YES", the processing proceeds to a step S04.

Then, in the step S04, energization of the motor for power generation 13 is started, thereby reducing the amount of energization of the motor for running 14 and also increasing the amount of energization of the motor for power generation 13, and energization is switched such that a decrease in the output of the motor for running 14 and an increase in the output of the motor for power generation 13 are made to be the same.

Next, in a step S05, energization of the motor for running 14 is stopped, thereby prohibiting torque generation from the motor for running 14.

Then, in a step S06, whether or not the temperature of the inverter 71 of the GENPDU 51 that controls energization of the motor for power generation 13 is higher than a predetermined temperature is determined.

In a case where the determination result is "YES", the processing proceeds to step a S11, which will be described later.

On the other hand, in a case where the determination result is "NO", the processing proceeds to a step S07.

Then, in the step S07, whether or not the temperature of the inverter 71 of the MOTPDU 52 that controls energization of the motor for running 14 is less than or equal to a predetermined temperature and the required torque corresponding to the required driving force of the driver has been increased is determined.

In a case where the determination result is "NO", the processing returns to the step S05 described above.

On the other hand, in a case where the determination result is "YES", the processing proceeds to a step S08.

Next, in the step S08, whether or not the stall state has been eliminated is determined In a case where the determination result is "NO", the processing returns to the step S05 described above.

On the other hand, in a case where the determination result is "YES", the processing proceeds to END.

Further, in the step S09, whether or not the motor for power generation 13 is in a stall state is determined.

In a case where the determination result is "NO", the processing proceeds to On the other hand, in a case where the determination result is "YES", the processing proceeds to a step S10.

Then, in the step S10, whether or not the temperature of the inverter 71 of the GENPDU 51 that controls energization of the motor for power generation 13 is higher than a predetermined temperature is determined In a case where the determination result is "NO", the processing returns to the step S09 described above.

On the other hand, in a case where the determination result is "YES", the processing proceeds to the step S11.

Then, in the step S11, energization of the motor for running 14 is started, thereby reducing the amount of energization of the motor for power generation 13 and also increasing the amount of energization of the motor for running 14, and energization is switched such that a decrease in the output of the motor for power generation 13 and an increase in the output of the motor for running 14 are made to be the same.

Next, in a step S12, energization of the motor for power generation 13 is stopped, thereby prohibiting torque generation from the motor for power generation 13.

Then, in a step S13, whether or not the temperature of the inverter 71 of the MOTPDU 52 that controls energization of the motor for running 14 is higher than a predetermined temperature is determined.

In a case where the determination result is "YES", the processing returns to the step S04 described above.

On the other hand, in a case where the determination result is "NO", the processing proceeds to a step S14.

Then, in the step S14, whether or not the temperature of the inverter 71 of the GENPDU 51 that controls energization of the motor for power generation 13 is less than or equal to a predetermined temperature and the required torque corresponding to the required driving force of the driver has been increased is determined.

In a case where the determination result is "NO", the processing returns to the step S12 described above.

On the other hand, in a case where the determination result is "YES", the processing proceeds to a step S15.

Next, in the step S15, whether or not the stall state has been eliminated is determined.

In a case where the determination result is "NO", the processing returns to the step S12 described above.

On the other hand, in a case where the determination result is "YES", the processing proceeds to END.

As described above, according to the control device of an electric vehicle 10 and the control method of an electric vehicle by this embodiment, even in a case where a stall state where rotation of the motor for running 14 that is in an energization state stops or the speed of rotation becomes less than or equal to a predetermined speed has occurred, for example, in a case where the speed of the hybrid vehicle 1 has been reduced to zero at an uphill, or the like, the motor for running 14 or the motor for power generation 13 which is subjected to energization (that is, the motor assuming a stall state) is switched based on the temperature of the GENPDU 51 or the MOTPDU 52.

In this way, it is possible to cool power equipment such as the GENPDU 51, the MOTPDU 52, the motor for power generation 13, and the motor for running 14 without reversing the hybrid vehicle 1, and thus it is possible to prevent the temperature of the power equipment from rising excessively.

In addition, even if energization is switched, control is performed such that a decrease in the output of the motor of which energization is stopped (that is, one of the motor for running 14 and the motor for power generation 13) is compensated for by an increase in the output of the motor of which energization is started (that is, the other one of the motor for running 14 and the motor for power generation 13).

In this way, since the output of the motor for running 14 and the motor for power generation 13 as a whole is maintained unchangeably, even in a case where the required driving force of the driver is changed, it is possible to secure the proper responsiveness following the change, and the desired merchantability.

In addition, by repeatedly switching energization to the GENPDU 51, the MOTPDU 52, the motor for power generation 13, and the motor for running 14 in which there is a margin in the temperature, it becomes possible to maintain a stall state over a long period of time, and it is possible to suppress an increase in the temperature of the power equipment as a whole.

In addition, in the motor for power generation 13, since an energization phase is switched and energization is then restarted, concentration of energization on a single energization phase is prevented, and thus a local and excessive increase in the temperature of the power equipment such as the motor for power generation 13 and the GENPDU 51, or occurrence of local degradation can be prevented.

In addition, in a case where the required driving force of the driver is greater than or equal to a predetermined value, it is determined that elimination of a stall state is desired, and thus the output of the other motor (that is, the motor other than the motor assuming a stall state) is added to the output of the motor assuming a stall state, of the motor for power generation 13 and the motor for running 14 and power corresponding to the required driving force is then output from the other motor.

In this way, it is possible to appropriately reflect the intention of the driver in the operation state of the hybrid vehicle 1 while preventing the temperature of the power equipment such as the GENPDU 51, the MOTPDU 52, the motor for power generation 13, and the motor for running 14 from rising excessively.

In addition, since the motor for power generation 13 idles with respect to the motor for running 14 at the time of reverse rotation, it is possible to easily switch the energization phase of the motor for power generation 13 without transmitting a driving force from the motor for power generation 13 to the motor for running 14 and the driving wheels W, and it is possible to prevent a local and excessive increase in the temperature.

In addition, with respect to disposition of the motor for power generation 13, the motor for running 14, and the one-way clutch 27, it is possible to improve disposition efficiency in the axial direction.

In addition, since the motor for power generation 13 performs driving of the internal-combustion engine 12 at the time of reverse rotation or power generation by the driving force of the internal-combustion engine 12, in addition to driving of the driving wheels W at the time of normal rotation, it is possible to easily switch the energization phase of the motor for power generation 13 while diversifying the operation state of the hybrid vehicle 1, and it is possible to prevent a local and excessive increase in temperature.

Figure 11:
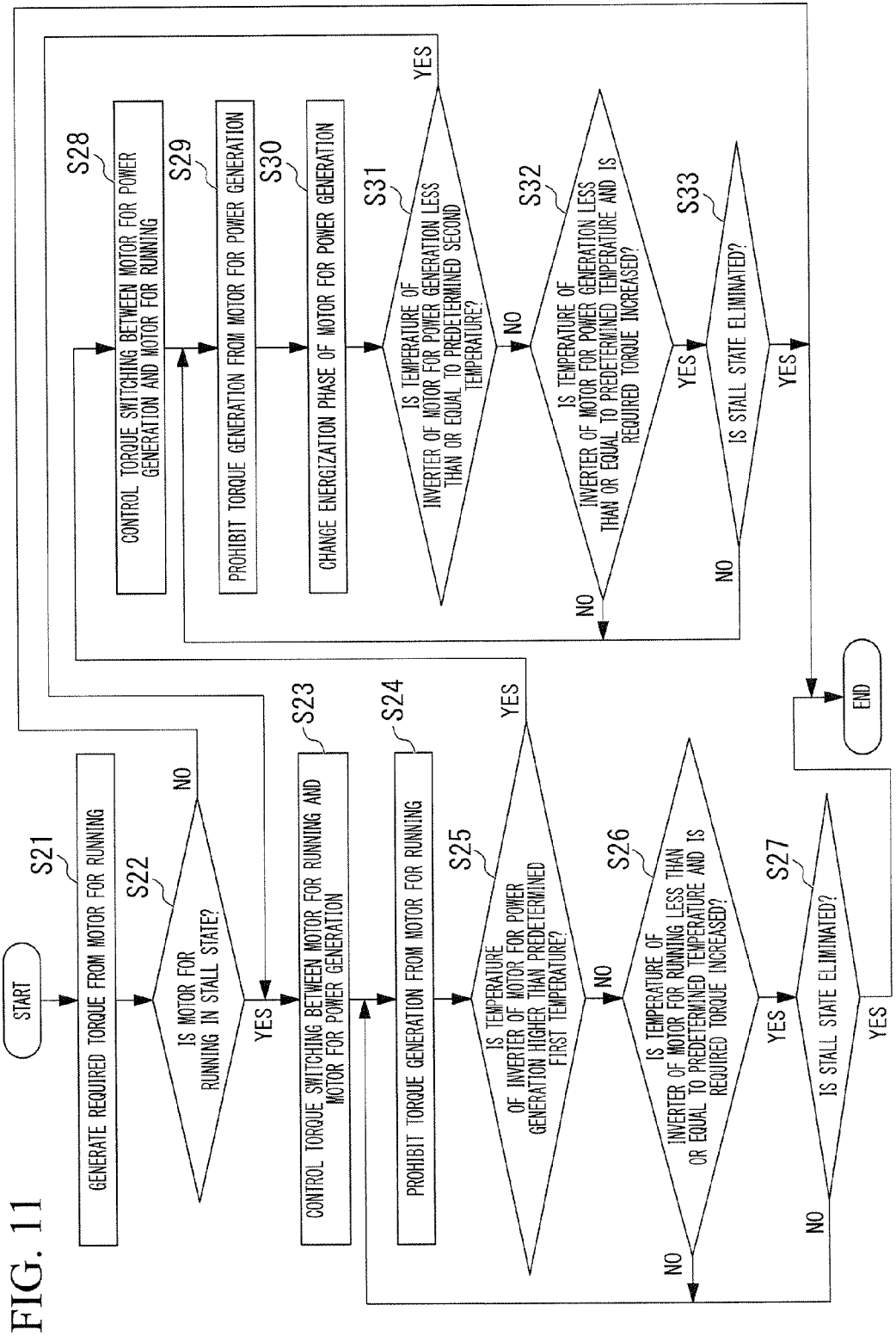
FIG. 11 is a flowchart showing an operation of a control device of an electric vehicle according to a modified example of the embodiment of the invention.

In addition, in the embodiment described above, like a modified example of the above-described embodiment, which is shown in, for example, FIG. 11, a configuration is also acceptable in which, basically, the motor for power generation 13 assumes a stall state, and when the temperature of the inverter 71 of the GENPDU 51 controlling the energization of the motor for power generation 13 has risen, the motor for running 14 assumes a stall state, and thereafter, in a case where the temperature of the inverter 71 of the GENPDU 51 has been reduced, the motor for power generation 13 assumes a stall state again.

In this case, the MGECU 60 drives the motor for power generation 13 by electric power that is output from the battery 54, prior to restart of energization of the motor for power generation 13, thereby switching the energization phase of the motor for power generation 13.

Hereinafter, a flowchart of processing which is executed by the MGECU 60 in the modified example will be described.

First, in a step S21 shown in, for example, FIG. 11, required torque corresponding to the required driving force of the driver based on a signal or the like of a detection result which is output from, for example, the accelerator position sensor 81 is generated from the motor for running 14.

Next, in a step S22, whether or not the motor for running 14 is in a stall state, that is, a state where rotation stops or the speed of rotation becomes less than or equal to a predetermined speed occurs in an energization state of the motor for running 14 which can transmit a driving force to the driving wheels W, is determined In a case where the determination result is "NO", the processing proceeds to END.

On the other hand, in a case where the determination result is "YES", the processing proceeds to a step S23.

Then, in the step S23, energization of the motor for power generation 13 is started, thereby reducing the amount of energization of the motor for running 14 and also increasing the amount of energization of the motor for power generation 13, and energization is switched such that a decrease in the output of the motor for running 14 and an increase in the output of the motor for power generation 13 are made to be the same.

Next, in a step S24, energization of the motor for running 14 is stopped, thereby prohibiting torque generation from the motor for running 14.

Then, in a step S25, whether or not the temperature of the inverter 71 of the GENPDU 51 that controls energization of the motor for power generation 13 is higher than a predetermined first temperature (that is, lower limit temperature of a temperature range to prohibit energization of the motor for power generation 13) is determined.

In a case where the determination result is "YES", the processing proceeds to a step S28, which will be described later.

On the other hand, in a case where the determination result is "NO", the processing proceeds to a step S26.

Then, in the step S26, whether or not the temperature of the inverter 71 of the MOTPDU 52 that controls energization of the motor for running 14 is less than or equal to a predetermined temperature and the required torque corresponding to the required driving force of the driver has been increased is determined In a case where the determination result is "NO", the processing returns to the step S24 described above.

On the other hand, in a case where the determination result is "YES", the processing proceeds to a step S27.

Next, in the step S27, whether or not the stall state has been eliminated is determined.

In a case where the determination result is "NO", the processing returns to the step S24 described above.

On the other hand, in a case where the determination result is "YES", the processing proceeds to END.

Further, in the step S28, energization of the motor for running 14 is started, thereby reducing the amount of energization of the motor for power generation 13 and also increasing the amount of energization of the motor for running 14, and energization is switched such that a decrease in the output of the motor for power generation 13 and an increase in the output of the motor for running 14 are made to be the same.

Next, in a step S29, energization of the motor for power generation 13 is stopped, thereby prohibiting torque generation from the motor for power generation 13.

Next, in a step S30, the motor for power generation 13 is driven by electric power which is output from battery 54, and thus an energization phase is switched.

Then, in a step S31, whether or not the temperature of the inverter 71 of the GENPDU 51 that controls energization of the motor for power generation 13 is less than or equal to a predetermined second temperature (that is, upper limit temperature of a temperature range to allow energization of the motor for power generation 13) that is lower than or equal to the predetermined first temperature is determined.

In a case where the determination result is "YES", the processing returns to the step S23 described above.

On the other hand, in a case where the determination result is "NO", the processing proceeds to a step S32.

Then, in the step S32, whether or not the temperature of the inverter 71 of the GENPDU 51 that controls energization of the motor for power generation 13 is less than or equal to a predetermined temperature and the required torque corresponding to the required driving force of the driver has been increased is determined.

In a case where the determination result is "NO", the processing returns to the step S29 described above.

On the other hand, in a case where the determination result is "YES", the processing proceeds to a step S33.

Next, in the step S33, whether or not the stall state has been eliminated is determined.

In a case where the determination result is "NO", the processing returns to the step S29 described above.

On the other hand, in a case where the determination result is "YES", the processing proceeds to END.

In addition, in the embodiment described above, the control device of an electric vehicle 10 has been set to be mounted on the hybrid vehicle 1. However, there is no limitation thereto and the control device of an electric vehicle 10 may be mounted on another electric vehicle which is provided with a plurality of rotary electric machines that generates power for vehicle running, for example.

In addition, in the embodiment described above, the control unit may repeatedly switch energization in a case where the stall state is detected by the stall state-detecting unit.

Accordingly, by repeatedly switching energization to the energization control unit and the rotary electric machines that have margins in the temperature, it becomes possible to maintain a stall state over a long period of time, and it is possible to suppress an increase in the temperature of the power equipment as a whole.

The control device of an electric vehicle may further include a required driving force-detecting unit that detects a required driving force of a driver, wherein the control unit may output power corresponding to the required driving force from the another rotary electric machine in which the stall state is not detected by the stall state-detecting unit, among the plurality of the rotary electric machines, in a case where the required driving force greater than or equal to a predetermined value is detected by the required driving force-detecting unit in a state where the stall state is detected by the stall state-detecting unit.

Accordingly, in a case where the required driving force of the driver is greater than or equal to a predetermined value, it is determined that elimination of a stall state is desired, and thus the output of another rotary electric machine (that is, the rotary electric machine other than the rotary electric machine assuming a stall state) is added to the output of the rotary electric machine assuming a stall state and power corresponding to the required driving force is output from another rotary electric machine.

In this way, it is possible to appropriately reflect the intention of the driver in the operation state of the electric vehicle while preventing the temperature of the power equipment such as the energization control unit and the rotary electric machine from rising excessively.

The plurality of the rotary electric machines may include a first rotary electric machine and a second rotary electric machine of which rotary shafts are connected each other by a one-way clutch, wherein the rotary shaft of the second rotary electric machine may be connected to driving wheels, the one-way clutch may transmit a driving force to normally rotate the second rotary electric machine from the first rotary electric machine to the second rotary electric machine at the time of normal rotation of the first rotary electric machine and may cut off transmission of a driving force from the first rotary electric machine to the second rotary electric machine so as to idle the first rotary electric machine with respect to the second rotary electric machine at the time of reverse rotation of the first rotary electric machine, and the control unit may perform switching to an energization phase different from a previous energization phase by reversely rotating the first rotary electric machine when restarting energization of the first rotary electric machine of which energization has been stopped depending on the stall state having been detected by the stall state-detecting unit and the state quantity detected by the state quantity-detecting unit having exceeded the predetermined threshold value.

Accordingly, the first rotary electric machine idles with respect to the second rotary electric machine at the time of reverse rotation. For this reason, it is possible to easily switch the energization phase of the first rotary electric machine without transmitting a driving force from the first rotary electric machine to the second rotary electric machine and the driving wheels, and thus it is possible to prevent a local and excessive increase in the temperature and degradation.

The rotary shaft of the first rotary electric machine and the rotary shaft of the second rotary electric machine may form one of an inner periphery-side driving shaft and an outer periphery-side driving shaft that are coaxially disposed and the another, and the one-way clutch may be disposed so as to overlap a portion of at least one of a stator of the first rotary electric machine and a stator of the second rotary electric machine in an axial direction between the first rotary electric machine and the second rotary electric machine on a power transmission pathway between the inner periphery-side driving shaft and the outer periphery-side driving shaft.

Accordingly, with respect to disposition of the first rotary electric machine, the second rotary electric machine, and the one-way clutch, it is possible to improve disposition efficiency in an axial direction.

The rotary shaft of the first rotary electric machine may be connected to a crankshaft of an internal-combustion engine through a clutch, and the control unit may make the clutch be in a connection state in a case of driving the internal-combustion engine by a driving force that is generated at the time of a powering operation by reverse rotation of the first rotary electric machine or in a case of a power generation operation to drive the first rotary electric machine with reverse rotation by a driving force that is generated at the time of an operation of the internal-combustion engine, and may make the clutch be in a separation state in a case of performing switching to an energization phase different from a previous energization phase by reversely rotating the first rotary electric machine when restarting energization of the first rotary electric machine of which energization has been stopped depending on the stall state having been detected by the stall state-detecting unit and the state quantity detected by the state quantity-detecting unit having exceeded the predetermined threshold value.

Accordingly, the first rotary electric machine performs driving of the internal-combustion engine at the time of reverse rotation or power generation by the driving force of the internal-combustion engine, in addition to driving of the driving wheels at the time of normal rotation. For this reason, it is possible to easily switch the energization phase of the first rotary electric machine while diversifying the operation state of the electric vehicle, and thus it is possible to prevent a local and excessive increase in the temperature.

DESCRIPTION OF REFERENCE SYMBOLS

1: hybrid vehicle
10: control device of an electric vehicle
12: internal-combustion engine
13: motor for power generation (rotary electric machine, or first rotary electric machine)
13a: rotation sensor (stall state-detecting unit) 13S: stator
14: motor for running (rotary electric machine, or second rotary electric machine)
14a: rotation sensor (stall state-detecting unit) 14S: stator
22: second driving shaft (rotary shaft)
23: third driving shaft (rotary shaft)
26: clutch
51: GENPDU (energization control unit) 51a: sensor (state quantity-detecting unit)
52: MOTPDU (energization control unit) 52a: sensor (state quantity-detecting unit)
54: battery
60: MGECU (state quantity-detecting unit, stall state-detecting unit, control unit, or required driving force-detecting unit)
81: accelerator position sensor (required driving force-detecting unit)

The invention claimed is:

1. A control device of an electric vehicle comprising:
a plurality of rotary electric machines that generate power for vehicle running;
a plurality of energization control units that control energization of each of the plurality of the rotary electric machines;
a state quantity-detecting unit that detects a state quantity related to a temperature of each of the plurality of the energization control units;
a stall state-detecting unit that detects the presence or the absence of a stall state where, in an energization state of the rotary electric machine, a rotation stops or a rotational speed becomes less than or equal to a predetermined speed; and
a control unit that switches energization of the rotary electric machine in which the stall state is detected, to energization of another rotary electric machine in which the stall state is not detected by the stall state-detecting unit, among the plurality of the rotary electric machines, in a case where the state quantity detected by the state quantity-detecting unit with respect to the rotary electric machine in which the stall state is detected by the stall state-detecting unit exceeds a predetermined threshold value,
wherein the control unit switches energization such that a decrease in an output of the rotary electric machine in which the stall state is detected by the stall state-detecting unit and an increase in an output of the another rotary electric machine in which the stall state is not detected by the stall state-detecting unit are made to be the same, and the control unit performs switching to an energization phase different from a previous energization phase, when restarting energization of the rotary electric machine of which energization has been stopped depending on the stall state having been detected by the stall state-detecting unit and the state quantity detected by the state quantity-detecting unit having exceeded the predetermined threshold value.

2. The control device of an electric vehicle according to claim 1, wherein the control unit repeatedly switches energization in a case where the stall state is detected by the stall state-detecting unit.

3. The control device of an electric vehicle according to claim 1, further comprising:
a required driving force-detecting unit that detects a required driving force of a driver,
wherein the control unit outputs power corresponding to the required driving force from the another rotary electric machine in which the stall state is not detected by the stall state-detecting unit, among the plurality of the rotary electric machines, in a case where the required driving force greater than or equal to a predetermined value is detected by the required driving force-detecting unit in a state where the stall state is detected by the stall state-detecting unit.

4. The control device of an electric vehicle according to claim 1, wherein the plurality of the rotary electric machines include a first rotary electric machine and a second rotary electric machine of which rotary shafts are connected each other by a one-way clutch, wherein
the rotary shaft of the second rotary electric machine is connected to driving wheels,
the one-way clutch transmits a driving force to normally rotate the second rotary electric machine from the first rotary electric machine to the second rotary electric machine at the time of normal rotation of the first rotary electric machine and cuts off transmission of a driving force from the first rotary electric machine to the second rotary electric machine so as to idle the first rotary electric machine with respect to the second rotary electric machine at the time of reverse rotation of the first rotary electric machine, and
the control unit performs switching to an energization phase different from a previous energization phase by reversely rotating the first rotary electric machine when restarting energization of the first rotary electric machine of which energization has been stopped depending on the stall state having been detected by the stall state-detecting unit and the state quantity detected by the state quantity-detecting unit having exceeded the predetermined threshold value.

5. The control device of an electric vehicle according to claim 4, wherein the rotary shaft of the first rotary electric machine and the rotary shaft of the second rotary electric machine form one of an inner periphery-side driving shaft and an outer periphery-side driving shaft that are coaxially disposed and the another, and the one-way clutch is disposed so as to overlap a portion of at least one of a stator of the first rotary electric machine and a stator of the second rotary electric machine in an axial direction between the first rotary electric machine and the second rotary electric machine on a power transmission pathway between the inner periphery-side driving shaft and the outer periphery-side driving shaft.

6. The control device of an electric vehicle according to claim 4, wherein the rotary shaft of the first rotary electric machine is connected to a crankshaft of an internal-combustion engine through a clutch, and the control unit makes the clutch be in a connection state in a case of driving the internal-combustion engine by a driving force that is generated at the time of a powering operation by reverse rotation of the first rotary electric machine or in a case of a power generation operation to drive the first rotary electric machine with reverse rotation by a driving force that is generated at the time of an operation of the internal-combustion engine, and makes the clutch be in a separation state in a case of performing switching to an energization phase different from a previous energization phase by reversely rotating the first rotary electric machine when restarting energization of the first rotary electric machine of which energization has been stopped depending on the stall state having been detected by the stall state-detecting unit and the state quantity detected by the state quantity-detecting unit having exceeded the predetermined threshold value.

7. A control method of an electric vehicle that includes:

a plurality of rotary electric machines that generate power for vehicle running;

a plurality of energization control units that control energization of each of the plurality of the rotary electric machines;

a state quantity-detecting unit that detects a state quantity related to a temperature of each of the plurality of the energization control units;

a stall state-detecting unit that detects the presence or the absence of a stall state where, in an energization state of the rotary electric machine, a rotation stops or a rotational speed becomes less than or equal to a predetermined speed; and a control unit that switches energization of the rotary electric machine in which the stall state is detected, to energization of another rotary electric machine in which the stall state is not detected by the stall state-detecting unit, among the plurality of the rotary electric machines, in a case where the state quantity detected by the state quantity-detecting unit with respect to the rotary electric machine in which the stall state is detected by the stall state-detecting unit exceeds a predetermined threshold value, the control method comprising:

switching energization such that a decrease in an output of the rotary electric machine in which the stall state is detected by the stall state-detecting unit and an increase in an output of the another rotary electric machine in which the stall state is not detected by the stall state-detecting unit are made to be the same; and switching to an energization phase different from a previous energization phase, when restarting energization of the rotary electric machine of which energization has been stopped depending on the stall state having been detected by the stall state-detecting unit and the state quantity detected by the state quantity-detecting unit having exceeded the predetermined threshold value.

* * * * *